United States Patent
Liu et al.

(10) Patent No.: US 9,569,048 B2
(45) Date of Patent: Feb. 14, 2017

(54) TOUCH DISPLAY PANEL AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Yingming Liu, Beijing (CN); Xue Dong, Beijing (CN); Haisheng Wang, Beijing (CN); Hongjuan Liu, Beijing (CN); Weijie Zhao, Beijing (CN); Tao Ren, Beijing (CN); Lei Wang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 28 days.

(21) Appl. No.: 14/424,833

(22) PCT Filed: May 30, 2014

(86) PCT No.: PCT/CN2014/078896
§ 371 (c)(1),
(2) Date: Feb. 27, 2015

(87) PCT Pub. No.: WO2015/043222
PCT Pub. Date: Apr. 2, 2015

(65) Prior Publication Data
US 2016/0048232 A1    Feb. 18, 2016

(30) Foreign Application Priority Data

Sep. 30, 2013    (CN) .......................... 2013 1 0460382

(51) Int. Cl.
G06F 3/044 (2006.01)
G06F 3/041 (2006.01)
G06F 3/0488 (2013.01)

(52) U.S. Cl.
CPC ............ *G06F 3/044* (2013.01); *G06F 3/0412* (2013.01); *G06F 3/0488* (2013.01); *G06F 2203/04112* (2013.01); *G06F 2203/04808* (2013.01)

(58) Field of Classification Search
CPC ...... G06F 3/044; G06F 3/0412; G06F 3/0488; G06F 2203/04808; G06F 2203/04112
(Continued)

(56) References Cited

U.S. PATENT DOCUMENTS 8,243,027 B2 *  8/2012  Hotelling ............ G02F 1/13338
                                                 345/104
8,780,078 B2 *  7/2014  Kim ..................... G06F 3/0412
                                                 345/173

(Continued)

FOREIGN PATENT DOCUMENTS

CN         201477560 U      5/2010
CN         102760017 A     10/2012
(Continued)

OTHER PUBLICATIONS

1st office action issued in Chinese application No. 201310460382.1 dated Oct. 23, 2015.
(Continued)

*Primary Examiner* — Vijay Shankar
(74) *Attorney, Agent, or Firm* — Nath, Goldberg & Meyer; Joshua B. Goldberg

(57) ABSTRACT

The present invention provides a touch display panel comprising a touch driving electrode and a touch sensing electrode, wherein the touch display panel further comprises a
(Continued)

signal enhancement layer which is capable of generating electric field lines by coupling with the touch driving electrode and/or the touch sensing electrode. The present invention also provides a display device including the above touch display panel. When the operator's finger touches the surface of the touch display panel, a large amount of electric field lines generated by coupling of the signal enhancement layer are attracted to the operator's finger, thereby increasing the amount of change in capacitance, and the sensitivity of the touch display panel is further improved.

12 Claims, 2 Drawing Sheets

(58) Field of Classification Search
USPC .................................................. 345/173–179
See application file for complete search history.

(56) References Cited

U.S. PATENT DOCUMENTS

| | | | |
|---|---|---|---|
| 8,860,685 B2* | 10/2014 | Takeuchi | G06F 3/0418 |
| | | | 178/18.06 |
| 8,907,917 B2* | 12/2014 | Kim | G06F 3/0412 |
| | | | 345/104 |
| 9,274,654 B2* | 3/2016 | Slobodin | G06F 3/044 |
| 2011/0080373 A1 | 4/2011 | Wang et al. | |
| 2011/0096025 A1 | 4/2011 | Slobodin et al. | |
| 2012/0274603 A1* | 11/2012 | Kim | G06F 3/0412 |
| | | | 345/174 |

FOREIGN PATENT DOCUMENTS

| | | |
|---|---|---|
| CN | 202948433 U | 5/2013 |
| CN | 103488366 A | 1/2014 |
| CN | 203502945 U | 3/2014 |

OTHER PUBLICATIONS

English translation of Written Opinion of PCT/CN2014/078896 from ISR dated May 30, 2014 that was originally provided to the USPTO on Feb. 27, 2015 with the application.

International Search Report dated May 30, 2014 corresponding application No. PCT/CN2014/078896.

* cited by examiner

TOUCH DISPLAY PANEL AND DISPLAY DEVICE

This is a National Phase Application filed under 35 U.S.C. 371 as a national stage of PCT/CN2014/078896, filed May 30, 2014, an application claiming the benefit of Chinese Application No. 201310460382.1, filed Sep. 30, 2013, the content of each of which is hereby incorporated by reference in its entirety.

FIELD OF THE INVENTION

The present invention relates to a display panel, in particular to a touch display panel and a display device including the touch display panel.

BACKGROUND OF THE INVENTION

FIG. 1 shows a capacitive in-cell touch display panel comprising an array substrate 40 and an upper substrate 50 opposed to the array substrate 40, an upper polarizing sheet 60 is disposed on the upper substrate, touch driving electrodes 43, gate lines 41, and common electrodes 42 are provided on the array substrate 40, the touch driving electrodes 43 and the common electrodes 42 are arranged on a same layer and disposed with intervals, touch sensing electrodes 20 are provided on the inner surface (i.e. the surface facing towards the array substrate) of the upper substrate 50, the common electrode 42 corresponds to the touch sensing electrode 20. When the operator's finger does not touch the upper surface of the touch display panel, the touch sensing electrodes 20 receive electric field lines from the touch driving electrodes 43. When the operator's finger touches the upper surface of the touch display panel, the electric field lines emitted from the touch driving electrode 43 beneath the touch point are attracted to the operator's finger, the capacitance beneath the touch point is caused to change, thereby the coordinate of the touch point can be determined based on the change of the capacitance.

With the increasing requirements of operators to the touch sensitivity, how to improve the sensitivity of the finger touch becomes a technical problem to be solved in the present field.

SUMMARY OF THE INVENTION

The object of the present invention is to provide a touch display panel and a display device including the touch display panel, which can provide improved sensitivity when being touched by a human finger.

To achieve the above object, as one aspect of the present invention, there is provided a touch display panel comprising a touch driving electrode and a touch sensing electrode, wherein the touch display panel further comprises a signal enhancement layer which is capable of generating electric field lines by coupling with the touch driving electrode and/or the touch sensing electrode.

Preferably, the touch display panel comprises an array substrate and an upper substrate opposed to the array substrate, the touch driving electrode is disposed on the array substrate, the touch sensing electrode is disposed on a surface of the upper substrate facing towards the array substrate, and the signal enhancement layer is disposed on the surface of the upper substrate directing away from the array substrate.

Preferably, the projection of the signal enhancement layer on the array substrate does not overlap the touch driving electrode, and the projection of the signal enhancement layer on the upper substrate does not overlap the touch sensing electrode.

Preferably, the signal enhancement layer includes horizontal lines and vertical lines which are mutually intersected.

Preferably, the signal enhancement layer is disposed in the regions corresponding to the black matrixes of the touch display panel.

Preferably, the signal enhancement layer comprises a plurality of rectangular frames.

Preferably, the signal enhancement layer is made of indium tin oxide material.

As one aspect of the present invention, there is provided a display device including the touch display panel provided by the present invention as mentioned above.

The signal enhancement layer of the touch display panel is coupled with the touch driving electrode and the touch sensing electrode, so that a large amount of electric field lines are generated, when the operator's finger touches the surface of the touch display panel, a large amount of electric field lines having higher divergence are generated by coupling of the signal enhancement layer and are attracted to the operator's finger, thereby increasing the amount of change in capacitance, and the sensitivity of the touch display panel is further improved.

BRIEF DESCRIPTION OF THE DRAWINGS

The drawings are used to provide a further understanding of the present invention, and constitute a part of the specification for explaining the present invention together with the following embodiments, but shall not be construed as limiting the present invention.

In the drawings.

REFERENCE NUMERALS

Figure 1:
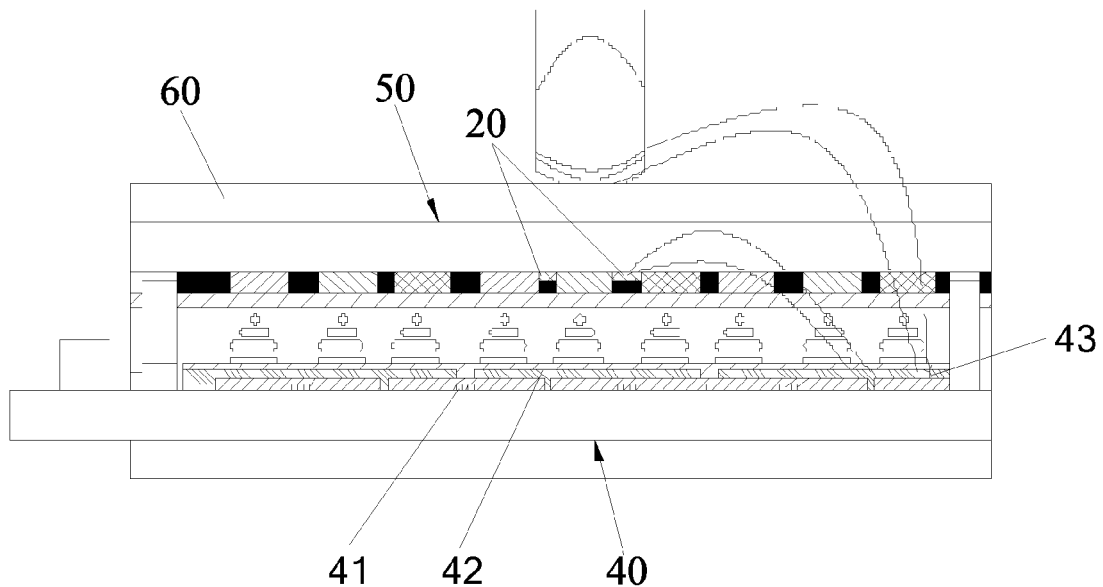
FIG. 1 is a cross-sectional schematic view of a conventional touch display panel.

20: touch sensing electrode
30: signal enhancement layer
40: array substrate
41: gate line
42: common electrode
43: touch driving electrode
50: upper substrate
51: black matrix
52: glass substrate
53: color filter layer
60: upper polarizing sheet

DETAILED DESCRIPTION OF THE EMBODIMENTS

The present invention will be further described below in details in conjunction with the accompanying drawings and specific embodiments. It should be understood that, specific embodiments described herein are only used to explain the present invention, but not to limit the present invention.

Figure 2:
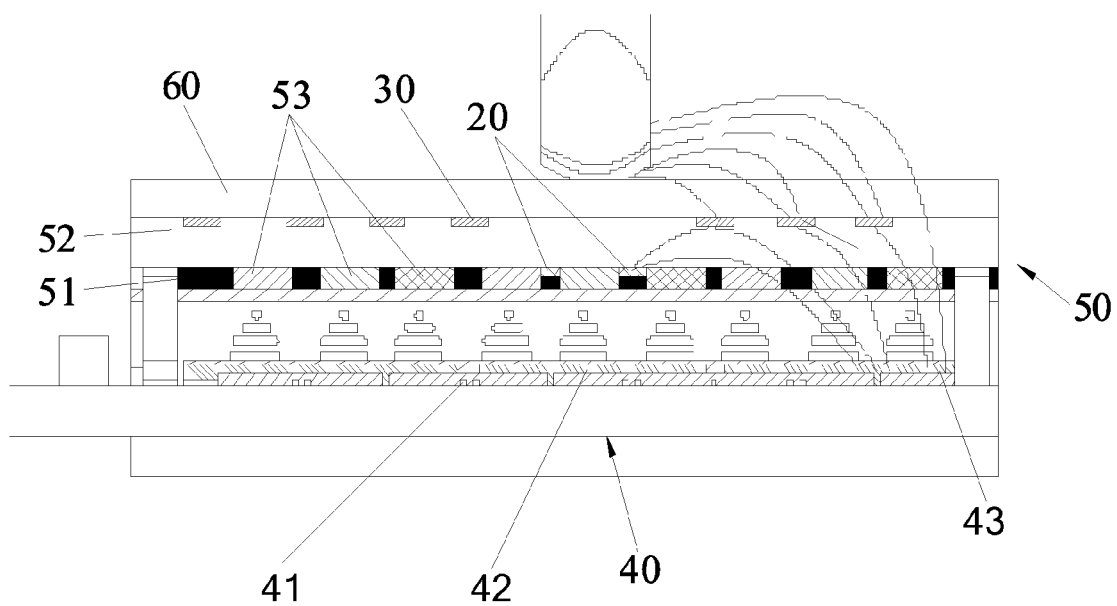
FIG. 2 is a cross-sectional schematic view of the touch display panel provided by the present invention.

As shown in FIG. 2, as one aspect of the present invention, there is provided a touch display panel comprising a touch driving electrode 43 and touch sensing electrodes 20, wherein the touch display panel further comprises a signal enhancement layer 30 which is capable of generating electric field lines by coupling with the touch driving electrode 43 and/or the touch sensing electrodes 20.

A large amount of electric field lines are generated when the signal enhancement layer 30 is coupled with the touch driving electrode 43 and/or the touch sensing electrodes 20, when the operator's finger touches the surface of the touch display panel, the large amount of electric field lines generated by coupling of the signal enhancement layer 30 are attracted to the operator's finger, thereby increasing the amount of change in capacitance, and the sensitivity of the touch display panel is further improved.

It should be understood that in the touch display panel provided by the present invention, the signal enhancement layer 30 is floated. That is, the signal enhancement layer 30 is not used for leading out any signal, and is not connected to any IC, so that the touch signal enhancement layer 30 almost have no influence on the overall thickness of the panel.

In the present invention, the specific location of the signal enhancement layer 30 is not particularly limited, as long as electric field lines can be generated by the signal enhancement layer 30 coupling with the touch driving electrode 43 and/or the touch sensing electrodes 20, such that the electric field lines attracted to the operator's finger during touch operation can be increased. In the embodiment shown in FIG. 2, the signal enhancement layer 30 is disposed above the touch sensing electrodes 20; in other embodiments (not shown), the signal enhancement layer 30 may be disposed at other locations of the touch display panel according to the specific requirements.

In the present invention, the signal enhancement layer 30 may be formed by conventional patterning process, i.e., firstly a film layer for forming the signal enhancement layer is deposited, then the film layer is coated thereon with photoresist, exposed and developed, and is finally etched to form a signal enhancement layer 30 having a desired shape. Of course, the signal enhancement layer 30 can be formed in a manner of printing other conductive layers.

The touch display panel provided by the present invention is a mutual capacitive touch display panel, which may be an in-cell touch display panel or an on-cell touch display panel.

When the touch display panel is an on-cell touch display panel, the touch display panel comprises a display screen and a touch panel disposed on the display panel, the touch panel includes the touch driving electrodes and the touch sensing electrodes, in this case, the signal enhancement layer may be provided on the upper surface of the touch panel, and then a protective substrate or a protective film is provided on the signal enhancement layer.

In the embodiment shown in FIG. 2, the touch display panel is an in-cell touch display panel. Specifically, the touch display panel comprises the array substrate 40 and the upper substrate 50 opposed to the array substrate 40, the touch driving electrodes 43 are disposed on the array substrate 40, the touch sensing electrodes 20 are disposed on a surface of the upper substrate 50 facing towards the array substrate 40, the signal enhancement layer 30 is disposed on the surface of the upper substrate 50 directing away from the array substrate 40. In FIG. 2, 41 represents the gate line, 42 represents the common electrode, the common electrode 42 corresponds to the touch sensing electrode 20. By providing an in-cell touch display panel, the thickness of the touch display panel can be reduced.

When touch operation is performed by the operator, the operator's finger is closer to the surface of the upper substrate 50 directing away from the array substrate 40, therefore, if the signal enhancement layer 30 is disposed on the surface of the upper substrate 50 directing away from the array substrate 40 (i.e. the signal enhancement layer is located above the touch sensing electrodes), more electric field lines can be attracted by the operator's finger, thus the touch sensitivity can be improved.

As shown in FIG. 2, when the touch display panel is an in-cell touch display panel, the signal enhancement layer 30 can be provided between the upper polarizing sheet 60 and the upper substrate 50 of the touch display panel.

In the present invention, the touch display panel may display black and white images or display color images. When the touch display panel displays color images, the upper substrate 50 may include a glass substrate 52 and a color filter layer 53 (including red, green and blue filters) disposed on the inner surface of the glass substrate 52 (i.e. the surface facing towards the array substrate 40), the signal enhancement layer 30 is disposed on the outer surface of the glass substrate 52 (i.e. the surface facing towards the upper polarizing sheet 60).

It should be understood that, when the operator's finger touches the surface of the touch display panel for touch operation, very few vertical electric field lines between the touch driving electrode 43 and the touch sensing electrode 20 are attracted by the finger, the finger attracts the non-vertical electric field lines (i.e. the effective electric field lines) between the touch driving electrode 43 and the touch sensing electrode 20. In this case, in order to increase the effective electric field lines generated by coupling of the signal enhancement layer 30, preferably, the projection of the signal enhancement layer 30 on the array substrate 40 does not overlap the touch driving electrode 43, and the projection of the signal enhancement layer 30 on the upper substrate 50 does not overlap the touch sensing electrode 20.

Figure 3:
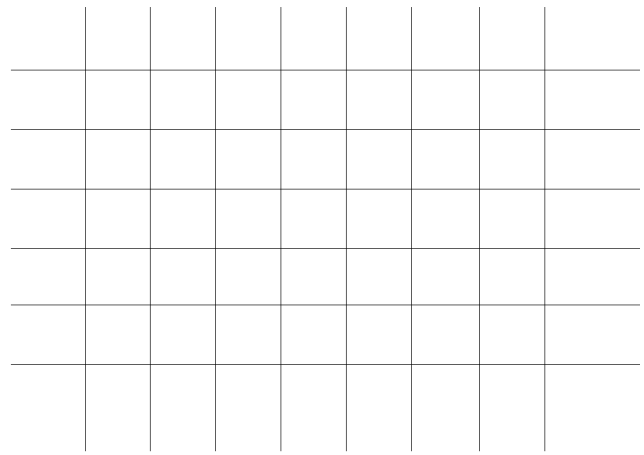
FIG. 3 is a top schematic view of an embodiment of the signal enhancement layer in the touch display panel provided by the present invention.

As an embodiment of the present invention, as shown in FIG. 3, the signal enhancement layer 30 may include horizontal lines and vertical lines which are mutually intersected. The horizontal lines and the vertical lines are intersected to form meshes, since the touch area of a finger ranges from about 1 mm$^2$ to 5 mm$^2$, preferably, the area of each mesh ranges from 1 mm$^2$ to 5 mm$^2$.

In order not to affect the aperture ratio of the touch display panel, preferably, the signal enhancement layer 30 may be disposed within the regions corresponding to the black matrixes 51 of the touch display panel. As shown in FIG. 2, the signal enhancement layer 30 is disposed directly above the black matrixes 51. In this case, the signal enhancement layer 30 shall be made of metal material, e.g., aluminum, molybdenum, and so on.

Figure 4:
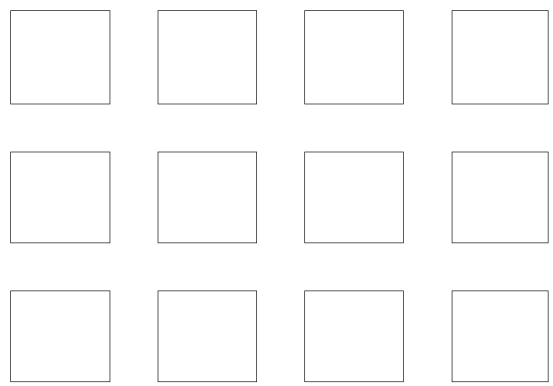
FIG. 4 is a top schematic view of another embodiment of the signal enhancement layer in the touch display panel provided by the present invention.

Alternatively, as another embodiment of the present invention, as shown in FIG. 4, the signal enhancement layer 30 may comprise a plurality of rectangular frames. Similarly, the area of each rectangular frame may be set as 1 mm$^2$ to 5 mm$^2$.

The advantage resulted from above two arrangements is that, the signal enhancement layer 30 can be coupled with the touch driving electrodes 43 and/or the touch sensing electrodes 20 to generate electric field lines in various directions, wherein the electric field lines surround the meshes or the rectangular frames, so that the electric field lines in various directions attracted by the operator's finger during touch operation can be increased, thereby the sensitivity of touch operation is improved.

In addition, the signal enhancement layer 30 may also be of a variety of other forms, e.g., the signal enhancement layer 30 may be formed by metal strips arranged in parallel.

Of course, the present invention has no particular limitation to the location of the signal enhancement layer 30, which may be also disposed above the pixel region. In order not to affect the aperture ratio, preferably, the signal enhancement layer 30 may be made of indium tin oxide (ITO) material. Since thus formed signal enhancement layer 30 does not affect the aperture ratio, the positional accuracy requirement for the signal enhancement layer 30 is lowered, thereby reducing the total fabrication costs of the touch display panel.

As another aspect of the present invention, there is provided a display device including the touch display panel provided by the present invention as described above.

The signal enhancement layer of the touch display panel is coupled with the touch driving electrodes and the touch sensing electrodes, so that a large amount of electric field lines are generated, when the operator's finger touches the surface of the touch display panel, a large amount of electric field lines having higher divergence are generated by coupling of the signal enhancement layer and are attracted to the operator's finger, thereby increasing the amount of change in capacitance, and the sensitivity of the touch display panel is further improved.

The display device provided by the present invention may be a mobile phone, a tablet computer, and the like.

It should be understood that above embodiments are only exemplary embodiments for illustrating the principle of the present invention; the present invention is not limited thereto. Various variations and improvements can be made by persons skilled in the art without departing from the spirit and essence of the present invention, and these variations and improvements should also be considered to be within the protection scope of the present invention.

The invention claimed is:

1. A touch display panel, comprising a touch driving electrode and a touch sensing electrode, wherein the touch display panel further comprises
   a signal enhancement layer which is capable of generating electric field lines by coupling with the touch driving electrode and/or the touch sensing electrode; and
   an array substrate and an upper substrate opposed to the array substrate, the touch driving electrode is disposed on the array substrate, the touch sensing electrode is disposed on a surface of the upper substrate facing towards the array substrate, the signal enhancement layer is disposed on the surface of the upper substrate facing away from the array substrate, wherein the projection of the signal enhancement layer on the array substrate does not overlap the touch driving electrode, and the projection of the signal enhancement layer on the upper substrate does not overlap the touch sensing electrode.

2. The touch display panel according to claim 1, wherein the signal enhancement layer includes horizontal lines and vertical lines which are mutually intersected.

3. The touch display panel according to claim 2, wherein the signal enhancement layer is disposed in the regions corresponding to the black matrix of the touch display panel.

4. The touch display panel according to claim 1, wherein the signal enhancement layer comprises a plurality of rectangular frames.

5. The touch display panel according to claim 1, wherein the signal enhancement layer is made of indium tin oxide material.

6. The touch display panel according to claim 3, wherein the signal enhancement layer is made of indium tin oxide material.

7. The touch display panel according to claim 3, wherein the signal enhancement layer is made of metal material.

8. A display device including a touch display panel comprising a touch driving electrode and a touch sensing electrode, wherein the touch display panel further comprises
   a signal enhancement layer which is capable of generating electric field lines by coupling with the touch driving electrode and/or the touch sensing electrode; and
   an array substrate and an upper substrate opposed to the array substrate, the touch driving electrode is disposed on the array substrate, the touch sensing electrode is disposed on a surface of the upper substrate facing towards the array substrate, the signal enhancement layer is disposed on the surface of the upper substrate facing away from the array substrate, wherein the projection of the signal enhancement layer on the array substrate does not overlap the touch driving electrode, and the projection of the signal enhancement layer on the upper substrate does not overlap the touch sensing electrode.

9. The display device according to claim 8, wherein the signal enhancement layer includes horizontal lines and vertical lines which are mutually intersected.

10. The display device according to claim 9, wherein the signal enhancement layer is disposed in the regions corresponding to the black matrix of the touch display panel.

11. The display device according to claim 8, wherein the signal enhancement layer comprises a plurality of rectangular frames.

12. The display device according to claim 8, wherein the signal enhancement layer is made of indium tin oxide material.

* * * * *